US006532286B1

(12) United States Patent
Burg (10) Patent No.: US 6,532,286 B1
(45) Date of Patent: Mar. 11, 2003

(54) METHOD AND SYSTEM FOR PROCESSING A TELEPHONE CALL

(75) Inventor: Frederick Murray Burg, West Long Branch, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/219,223

(22) Filed: Dec. 23, 1998

(51) Int. Cl.$^7$ .............................................. H04M 3/42
(52) U.S. Cl. ........................... 379/209.01; 379/211.01; 379/207.15; 379/210.01
(58) Field of Search ................................ 379/209, 207, 379/211, 210, 201, 88.17, 900, 93.01, 93.35

(56) References Cited

U.S. PATENT DOCUMENTS

| | | |
|---|---|---|
| 4,995,074 A | 2/1991 | Goldman et al. |
| 5,179,585 A | 1/1993 | MacMillan, Jr. et al. ..... 379/88 |

(List continued on next page.)

FOREIGN PATENT DOCUMENTS

| | | |
|---|---|---|
| AU | 59680/98 | 9/1998 |
| CA | 2138565 | 6/1996 |

(List continued on next page.)

OTHER PUBLICATIONS

RFC 1789 (http:www.faqs.org/rfcs/rfc1789.html), Apr. 1995.
Workstation Communications System, IBM Tech. Disclosure Bulletin, V. 37, No. 09, Sep. 1994, pp. 102–104.
The Internet Telephony Red Herring, *Colin Low*, Hewlett Packard, HPL–96–98, Jun. 1996.
Intelligent Network Realization and Evolution: CCITT Capability Set 1 and Beyond, S. Harris et al., International Switching Symposium, Yokohama, Japan, Oct. 25–30, 1992, Proceedings V. 2, pp. 127–131.
Internet Phone—Changing the Telephony Paradigm? R. Babbage et al., BT Technol J V. 15, No. 2, Apr. 1997, pp. 145–157.
Dial 1–800–Internet, Nathan Muller, BYTE, Feb. 1996, pp. 83–88.
Conversant v6.0 Interactive Information Response (IIR) System www.lucent.com.au/product range/mmedia/conversant.html 11/98.
DataSmart T3/E3 IDSU, www.kentrox.com/products/15951/15951.htm 11/98.
Maven Modem Summary, www.maven.com/Maven/Modems/Summary/05029601.htm 11/98.
Maven Modem Features Summary, wysiwyg://99/http://www.maven.com/Maven/Modems/Summary/05029601.htm 11/98.

(List continued on next page.)

*Primary Examiner*—Creighton Smith (57) ABSTRACT

The invention discloses a method and system for processing a telephone call to an on-line subscriber, when the subscriber telephone line is busy as a result of the on-line connection. The incoming call is forwarded to a server, where the calling station is given an option to leave a recorded message and particulars of the call (date and time) and calling station (telephone number and caller identification) are stored in a call-back list server. The system sends an alerting message to the data terminal of the on-line subscriber, where an icon, representing calls stored in the call-back list, is displayed to the subscriber. The subscriber may review particulars of calls stored in the call-back list and may return calls while remaining on-line using Internet telephony, or by other means, such as a TAPI interface. The subscriber may also review or retrieve stored messages in the voice-mail server while remaining on-line.

50 Claims, 9 Drawing Sheets

U.S. PATENT DOCUMENTS

| | | | |
|---|---|---|---|
| 5,274,700 A | 12/1993 | Gechter et al. | |
| 5,363,431 A | 11/1994 | Schull et al. | |
| 5,416,830 A | 5/1995 | MacMillan, Jr. et al. | 379/88 |
| 5,428,608 A | 6/1995 | Freeman et al. | |
| 5,533,110 A | 7/1996 | Pinard et al. | |
| 5,588,044 A | 12/1996 | Lofgren et al. | 379/67 |
| 5,712,907 A | 1/1998 | Wegner et al. | |
| 5,724,412 A | 3/1998 | Srinivasan | 379/93.23 |
| 5,742,596 A | 4/1998 | Baratz et al. | |
| 5,751,706 A | 5/1998 | Land et al. | |
| 5,768,513 A | 6/1998 | Kuthyar et al. | |
| 5,805,587 A | 9/1998 | Norris et al. | 370/352 |
| 5,809,128 A | 9/1998 | McMullin | |
| 5,870,565 A | 2/1999 | Glitho | |
| 5,894,504 A | 4/1999 | Alfred et al. | |
| 5,896,444 A | 4/1999 | Perlman et al. | |
| 5,916,302 A | 6/1999 | Dunn et al. | |
| 5,946,381 A | 8/1999 | Danne et al. | |
| 6,011,909 A | 1/2000 | Newlin et al. | |

FOREIGN PATENT DOCUMENTS

| | | |
|---|---|---|
| DE | 3315884 | 11/1984 |
| EP | 0 758 175 A1 | 2/1997 |
| EP | 0 794 643 A2 | 9/1997 |
| EP | 0 800 325 A2 | 10/1997 |
| EP | 0 856 981 A2 | 8/1998 |
| EP | 0 905 959 A2 | 3/1999 |
| JP | 06217032 A | 8/1994 |
| JP | 07170288 A | 7/1995 |
| WO | WO 95/18501 | 7/1995 |
| WO | WO 97/14238 | 4/1997 |
| WO | WO 97/16007 | 5/1997 |
| WO | WO 97/37483 | 10/1997 |
| WO | WO 97/46073 | 12/1997 |
| WO | WO 97/47118 | 12/1997 |
| WO | WO 97/47119 | 12/1997 |
| WO | WO 97/47127 | 12/1997 |
| WO | WO 98/01985 | 1/1998 |
| WO | WO 98/07266 | 2/1998 |
| WO | WO 98/19240 | 5/1998 |
| WO | WO 98/19448 | 5/1998 |
| WO | WO 98/19471 | 5/1998 |
| WO | WO 98/24224 | 6/1998 |
| WO | WO 98/36551 | 8/1998 |
| WO | WO 98/41032 | 9/1998 |
| WO | WO 98/51063 | 11/1998 |
| WO | WO 98/52332 | 11/1998 |
| WO | WO 98/52339 | 11/1998 |
| WO | WO 98/53617 | 11/1998 |
| WO | WO 98/54871 | 12/1998 |
| WO | WO 99/14924 | 3/1999 |

OTHER PUBLICATIONS

AT&T Instant Answers, www/att.com/features/0896/call-menow.html, 9/98.

AT&T News Release, www/att.com/press/0896/960827.bsa.html, 9/98.

Joanie Wexler, Industry gets serious about 'net phone calls, Infoworld, Nov. 25, 1996, p 39.

Will Wade, Net–Based phone Created, Electronic News, Jan. 19, 1998, pp16–17.

Frank Barbetta, PBXs Take Multiple Paths to the Future, BCR's Voice 2000, May 1998, pp32–36.

METHOD AND SYSTEM FOR PROCESSING A TELEPHONE CALL

FIELD OF THE INVENTION

The invention relates generally to the field of telephony and specifically to the field of telephony in conjunction with on-line access.

BACKGROUND OF THE INVENTION

Many computer users connect to outside data services through a dial-up type connection. As known in the field, this connection typically uses a MODEM to convert digital computer signals to analog signals for transmission over the public switch telephone network (PSTN). For many users, the PSTN connection used for their outside data services is the same connection used for traditional analog voice telephone services, and when connected to the outside data service, the telephone line associated with their telephone number is busy. When these users are concerned about missing an important call, they may restrict usage of the data service by family members to "late" hours when no calls are expected.

In the field of voice telephony, many optional services are provided such as call waiting and call forwarding to accommodate the subscriber. Because of differences in protocols and procedures, these services may be unavailable when the user is connected to the outside data service. Various methods and systems are proposed to improve telephony service for users when they are on-line. U.S. Pat. No. 5,805,587 (the '587 patent) to Norris et al., the specification of which is incorporated herein by reference, describes one such method and system used by a subscriber when on-line.

The system and method described in the '587 patent does not allow the subscriber to set a particular state while on-line. In particular, the '587 patent does not provide for an available-for-incoming-calls state and a not-available-for-incoming-calls state. In addition, the '587 patent does not provide a call-back list for storage of information or particulars of calls that are received while on-line to address the concern of missing important calls while working on-line undisturbed or while other family members work on-line. There is a need to provide these and other options for subscribers when on-line.

SUMMARY OF THE INVENTION

An objective of the invention is to provide a method and system for processing a telephone call where a subscriber telephone connection is busy as a result of an on-line connection and the subscriber does not wish to be disturbed while on-line, and therefore sets a not-available-for-incoming-calls state.

It is also an objective of the invention, in response to the not-available-for-incoming-calls state, when the system receives a call that is directed to the subscriber at a called station from a calling station, the system determines that the called station is connected to a server by an on-line data connection. The system sends an alerting message to the called station over the data connection to inform the called station of the incoming call, and the system stores particulars of the call and particulars of the calling station in a call-back list. The particulars of the call include date and time of the call, as well as the length of any message left by the calling station. The particulars of the calling station include the telephone number and caller identification of the calling station. A data terminal at the called station displays an icon when the alerting message is received, to inform the on-line subscriber of the incoming call and the fact that particulars were stored in the call-back list. The subscriber may return a call to the calling station while on-line using Internet telephony, or may use other techniques such as a TAPI interface. The subscriber may also access and retrieve messages from the calling station that were stored in the voice-mail server.

DETAILED DESCRIPTION

An on-line subscriber needs the ability to set different states while on-line. For example, among the possible states, the subscriber needs the ability to set an available-for-incoming-calls state and a not-available-for-incoming-calls state. The subscriber also needs a call-back list to store information or particulars related to incoming calls received while on-line and in a not-available-for-incoming-calls state. The subscriber also needs some form of notification that calls were stored in the call-back list while on-line and an ability to selectively return calls while remaining on-line, or after terminating the on-line connection.

In conjunction with the need for a call-back list, a subscriber may also have a voice-mail or general message forwarding service that handles incoming telephone calls according to pre-established criteria. The subscriber also needs to know of calls sent to message recording or the general message service while on-line as distinguished from calls sent to message recording or the general message service during other times. The subscriber also may desire knowledge of all calls that are received while on-line without the need to access the voice-mail or general message service.

It is also possible that the subscriber has multiple telephone lines or telephone numbers, but does not provide the number of the other lines for incoming calls. In this manner, the subscriber who receives an incoming call that is stored in a call-back list does not need to terminate the on-line connection to return the call, but can return the call on a second line.

System Description

Figure 1:
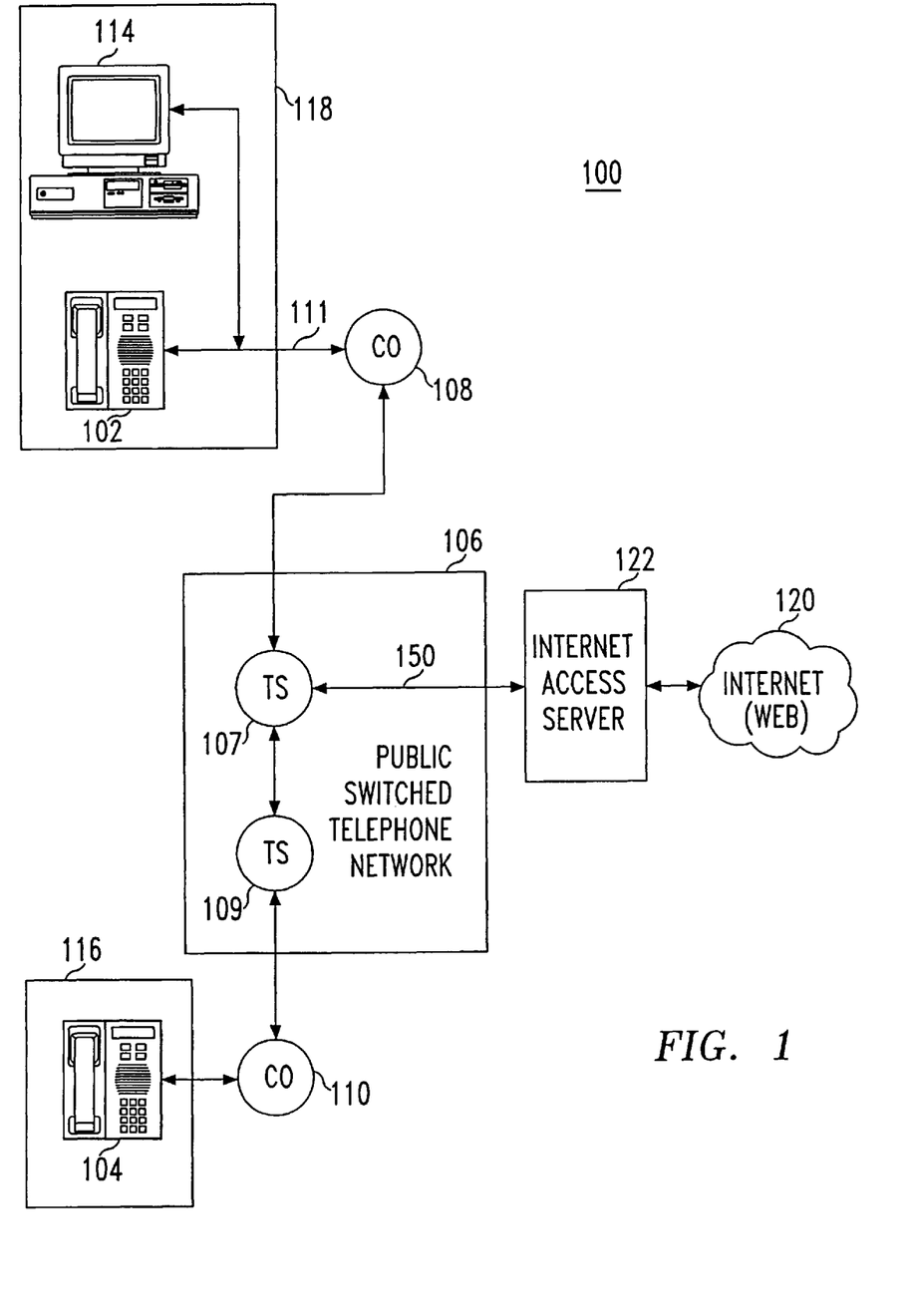
FIG. 1 illustrates a telecommunications system in which the principles of the invention may be practiced.

Referring to FIG. 1, a representative system 100 of the invention includes telephone instruments 102, 104 each connected to the PSTN 106 through central offices 108, 110. Connection 111 between telephone instrument 102 and the PSTN is typically a twisted pair wire cabling, but it can be any form of signal transmission media, including fiber optic and wireless. System 100 also includes data terminal 114, such as a personal computer, that is connected to the PSTN by connection 111. Using the configuration of FIG. 1, a subscriber at calling station 116 can connect telephone 104 to telephone 102 at called station 118 through central office 110, the PSTN 106, and central office 108. This connection is readily accomplished as long as data terminal 114 is not also connected to the PSTN by connection 111.

In an illustrative embodiment of the invention, data terminal 114 may be, for example, a personal computer running under the Microsoft Windows 95 operating system and driven by, for example, the Intel Pentium processor. Data terminal 114 includes a conventional sound card, such as the SoundBlaster sound card, as well as attached speakers and microphone. Also, conventional software packages such as Netscape Communicator (Netscape) software and NetMeeting (Microsoft) software are loaded in data terminal 114. As configured, a conventional modem interfaces data terminal 114 with connection 111.

Using system 100, a subscriber at station 118 can also connect data terminal 114 to the Internet 120 for access to on-line data services. The subscriber may not connect to the Internet if he/she is concerned about missing an important call. To connect, data terminal 114 establishes an off-hook condition on connection 111 and, using a series of DTMF tones, connects to Internet Access Server 122 through central office 108 and the PSTN. Once thus connected to the Internet, connection 111 is busy and any call from station 116 to station 118 will find the telephone number of station 118 busy. In addition, the subscriber at station 118 will not know of an incoming call from station 116. This is because the call waiting protocol, normally available for voice telephony calls to telephone instrument 102 at station 118, must be disabled in order for data terminal 114 to maintain an error-free connection to the Internet 120.

Figure 3:
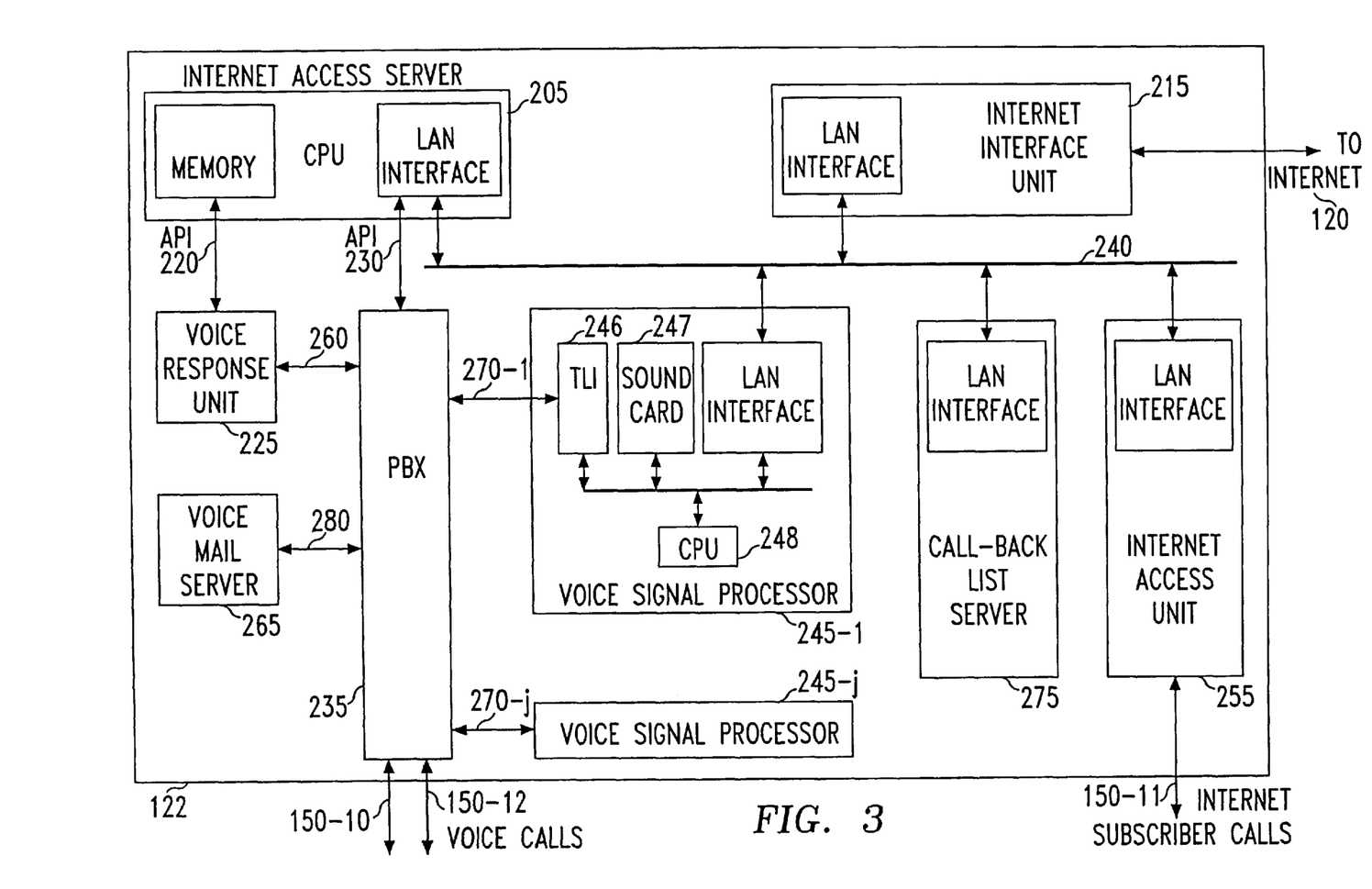
FIG. 3 is a broad block diagram of the Internet Access Server (IAS) of FIG. 1.

Further describing system 100 in FIG. 1, the user or subscriber associated with station 118 may access the Internet 120 by first loading appropriate Internet communications software, e.g., the Netscape Communicator software product, from Netscape, Inc. (hereinafter "Netscape" software), into the memory of data terminal 114. Data terminal 114 may be, for example, a personal computer having multimedia and telephony capability, as previously described. The subscriber, in a conventional manner, may then cause data terminal 114 to place a telephone call to an Internet Access Server that the subscriber is associated with, such as Internet Access Server (IAS) 122 to access the Internet, represented by block 120. In doing so, data terminal 114 places telephone line 111 in an off-hook state and then dials the telephone number assigned to LAS 122. Assuming that IAS 122 is not located in the same local dialing region as data terminal 114, then the telephone call will be routed via public switched telephone network (PSTN) 106, e.g., the AT&T network. Specifically, upon receipt of the dialed number, Central Office (CO) 108, in a conventional manner, establishes a telephone connection to toll switch (TS) 107 and passes the called number and the telephone number associated with line 111 to TS 107. TS 107, in turn and in a conventional manner, establishes a connection to IAS 122 via communication path 150. In an illustrative embodiment of the invention, communication path 150 may be one or more conventional T1 carrier lines each having 24 communications channels in which at least one of the channels serve as a signaling channel. TS 107 thus routes the call to IAS 122 by sending a so-called call setup message over the signaling channel, in which the message identifies, inter alia, the T1 channel carrying the incoming call, called telephone number, and calling telephone number. IAS 122 answers the call by sending an "acknowledgment" message over the signaling channel to TS 107. IAS 122 then sends conventional data communications signals to the data terminal 114 software that is adapted to allow the subscriber to communicate/interface with Internet 120.

Figure 2:
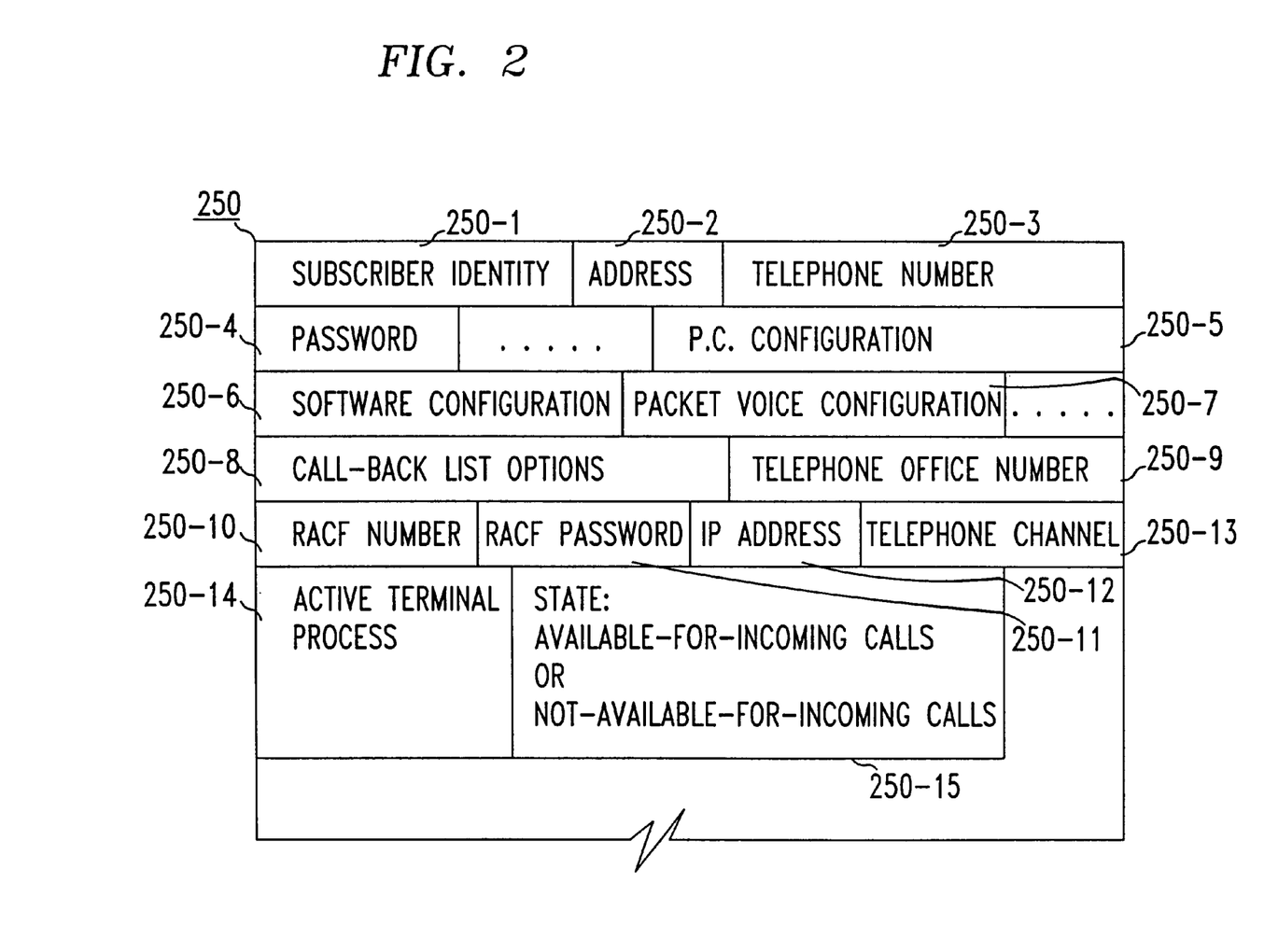
FIG. 2 is an illustrative example of a data record that may be used to implement the inventive service in the system of FIG. 1.

Responsive to receipt of the subscriber's incoming call, IAS 122 captures a subscriber identity and password from the data-stream of the subscriber's incoming call. IAS 122 uses the subscriber identity to access its internal memory to unload a data record that is associated with the subscriber. An illustrative example of such a record is shown in FIG. 2. Specifically, record 250 is formed from a number of fields respectively containing the subscriber's identity (name) 250-1, address 250-2, telephone number 250-3, password 250-4, and other data. IAS 122 permits the caller to access Internet 120 if the identity and password that the caller/subscriber enters via data terminal 114 matches the contents of fields 250-1 and 250-4. If such a match does not occur after the caller has made a number of attempts to enter the correct identity and password via data terminal 114, then IAS 122 terminates the call, as is done conventionally whenever a login fails. Assuming a match occurs, then IAS 122 communicates with the caller in accord with the contents of fields 250-5 and 250-6 (FIG. 2) which respectively specify the configuration of data terminal 114 and configuration of the Internet interface software, e.g., the aforementioned Netscape software, loaded in data terminal 114. In addition, IAS 122 assigns an Internet IP address to the data terminal and stores the address in field 250-12. (Alternatively, IAS 122 may assign such an address to the subscriber just once, when the subscriber initially enters a subscription for the service as is done conventionally.) IAS 122 thereafter uses the address to route the subscriber's data messages (packets) to and from Internet 120 via a conventional data router, as will be discussed below. IAS 122 also stores the address of the communications path 150 (i.e., B channel) used to receive the call in field 250-13. The subscriber may then begin to access Internet 120 in a conventional manner. That is, data terminal 114 formulates and transmits data packets addressed to Internet destinations indicative of entries/inquiries specified by the subscriber as a result of interacting with Internet 120 using the software loaded in data terminal 114. Similarly, IAS 122 routes via path 150 and TS 107 packets that it receives from the Internet and addressed to data terminal 114.

More specifically and also referring now to FIG. 3, it is seen that an IAS 122 includes Central Processor Unit (CPU) 205, which may be, for example, the SPARC 10 workstation commercially available from Sun Microsystems, Inc. CPU 205, which operates under the control of the well-known UNIX operating system, communicates with the various elements forming the associated IAS 122 via so-called Attached Processor Interfaces (API) 220 and 230, and via local area network (LAN) 240. Such elements include PBX 235 and Internet Access Unit (IAU) 255, in which PBX 235, may be, for example, the DEFINITY telecommunications system available from LUCENT and in which IAU 255 may be, for example, the Ascend MAX 4000 apparatus available from Ascend Communications, Inc. of Mountain View, Calif. PBX 235 and IAU 255, more particularly, are designed to present an interface to a communication path comprising 23 B channels and one D channel, e.g., T1 carrier 150-10, 150-11 and 150-12. Each such B channel may be used to establish a call connection between a telephone switch, e.g., TS 107, and the associated IAS 122. The D channel, on the other hand, may be used to transport signaling information relating to a B channel call connection.

(As will be discussed below, TS 107 routes calls directed to Internet 120 via IAS 122 over path 150-11 and routes calls that are forwarded to LAS 122 over path 150-10. Return calls using Internet Telephony to access TS 107 use path 150-12, as described below in greater detail.)

IAS 122 includes conventional Voice Response Unit (VRU) 225 which may be, for example, the CONVERSANT interactive information response (IIR) system available from LUCENT. It also includes a conventional voice-mail server (VMS) 265, for example, the LUCENT AUDIX telecommunications voice processor, for message recording and general messaging service. As will be discussed below, VRU 225 and VMS 265 are connected to PBX 235 via respective communications paths 260 and 280. IAS 122 further includes an Internet Interface Unit (IIU) 215 for providing a physical as well as a logical interconnection between LAN 240 and Internet 120. IIU 215 includes a conventional data router, for example, the model 7000 router available from Cisco Systems Inc., and a high-speed data service unit, for example, the DataSMART T3/E3 IDSU available from Kentrox of Portland, Oreg.

IAS 122 includes a plurality of voice signal processors (VSP) 245-1 through 245-j, one of which is illustrated in broad block diagram form, namely, VSP 245-1 (hereinafter just (VSP) 245). VSP 245 includes central processor unit (CPU) 248, telephone line interface (TLI) 246, sound card 247 and a connection to LAN 240. VSP 245 communicates with PBX 235 via a selected one of the paths 270, and communicates with processor 205, IIU 215 and IAU 255 via LAN 240. In an illustrative embodiment of the invention, VSP 245, may be, for example, a personal computer having an Intel Pentium processor running under the Microsoft Windows NT operating system, an Etherlink 10 BASE-T LAN interface card, a sound card 247 and a telephone line interface or modem 246.

VSP 245 interconnects conventional telephone signaling messages (e.g., D channel) and voice signals (e.g., B channel) received from PSTN 106 via PBX 235 and path 270-1 with conventional TCP/IP packet network communications that are transported over LAN 240 and Internet 120. The processing of calls forwarded from PSTN 106 and routed to Internet 120 via LAN 240 will be explained below in detail. It is noted at this point, however, that particular software, such as Microsoft NetMeeting software, may be used in VSP 245 to process, compress and then packetize voice signals that are received via PBX 235 and TLI 246 for transmission to Internet 120 via LAN 240. Similarly, such software may be used to convert the contents of packets representing voice into a stream of voice signals that is transmitted to station 116 via sound card 247, TLI 246, path 270-1, PBX 235, path 150-12, PSTN 106, TS 109, and CO 110.

IAS 122 also includes call-back list server 275 which may be, for example, a personal computer having an Intel Pentium processor running under the Microsoft Windows NT operating system, an Etherlink 10 BASE-T LAN interface card, A. and Microsoft ACCESS database application to store particulars of the call-back list. Call-back list server 275 is connected to and communicates with other elements of IAS 122 via LAN 240.

Call-Back List Setup

When a subscriber's Internet Access call (placed via data terminal 114) is received via a B channel of path 150-11, IAU 255 verifies subscriber service with a conventional login procedure. If the caller provides the correct identity and password (e.g., the password contained in field 250-4 of the associated record (FIG. 2), which IAU 255 also obtains as a result of communicating with processor 205 via LAN 240), then IAU 255 assigns a conventional IP address to the data terminal as a way of interfacing the call (assigned B channel) with Internet 120 via IIU 215. (It is noted that for a conventional Internet Access Server arrangement, the subscriber data terminal is assigned a permanent IP address which would be stored in field 250-12 (FIG. 2) at the time that the subscriber obtains the service.) In addition, IAU 255 notifies processor 205 that it has established the connection between data terminal 114 and the Internet 120.

Figure 4:
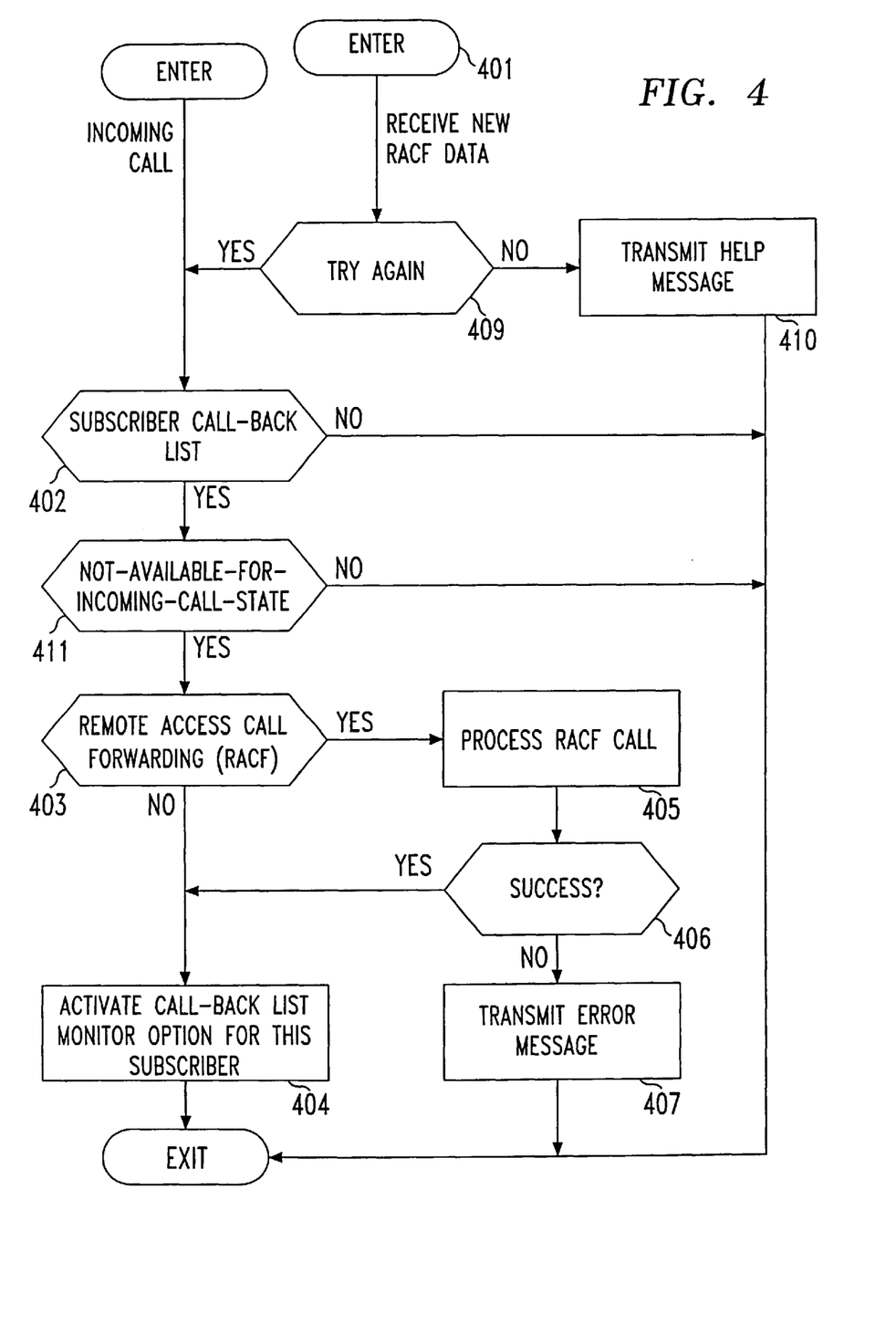
FIGS. 4, 5 and 7 illustrate in flow chart form the programs which implement the principles of the invention in the IAS of FIG. 1.

If the login is successful, then processor 205 invokes the program of FIG. 4. At step 402, processor 205 checks the contents of field 250-8 of the associated record 250 (FIG. 2) to determine if the caller subscribes to the inventive call-back list service. If not, then processor 205 exits the program.

At step 411, if the caller subscribes to the call-back list service, processor 205 checks whether the subscriber has set a not-available-for-incoming-calls state. If not, then processor 205 exits the program.

At step 403, if the subscriber has set a not-available-for-incoming-calls state, processor 205 updates the content of field 250-15 to indicate the state. Processor 205 then checks contents of record 250 to determine if a call-forwarding function is activated/deactivated remotely by IAS 122. (Such remote activation will also be referred to herein as Remote Access Call Forwarding (RACF) and is a feature that is currently offered by a local exchange carrier, e.g., Bell Atlantic by the service name of "Ultraforward" (service mark of Bell Atlantic), for a telephone call not involving the Internet.) Alternatively, such contents may indicate that the call forwarding function is selective and/or activated by the subscriber.

At step 405, assuming that the call forwarding function will be activated remotely by IAS 122, then processor 205 unloads a telephone number that it needs to call to activate the call forwarding service from field 250-9, which number is assumed to be associated with CO 108. Processor 205 then instructs VRU 225 via API 220 to place an out-going call to CO 108. In response to receiving an outgoing call request from VRU 225 via telephone line connection 260, PBX 235 selects an idle channel of communications path 150 (FIG. 1) and sends a call set-up message via the associated signaling channel to TS 107, in which the message includes the telephone number unloaded from field 250-9. TS 107, in turn, translates the called telephone number into a routing indicator, and, in accord with that indicator, establishes a telephone connection in a conventional manner to the CO 108 call forwarding service. That service responds to the incoming call by interacting with VRU 225 (which executes a "script" that it receives from processor 205) to obtain the subscriber's telephone number (250-3) and RACF password (field 250-11). Processor 205, via VRU 225 and in response to the latter request, outputs the contents of field 250-10 to the telephone connection extending back to CO 108, which contents is a telephone number associated with communication path 150-10 (FIG. 3) that is used for receiving forwarded calls, as will be discussed below. As a result of such interaction, CO 108 is thus primed during the time that station 118 is busy to forward a call directed to station 118 to IAS 122.

At step 406, processor 205 then checks to see if it had been successful in activating Remote Access Call Forwarding (RACF), as noted by the receipt of a confirmation from VRU 225 indicating that it had successfully interacted with CO 108.

At step 407, if call forwarding is not successful, processor 205 sends an error message to data terminal 114 for display. The message identifies the nature of the failure, which may be, for example, that CO 108 did not answer the out-going call or that VRU 255 received an error message from CO 108 after VRU 225 had transmitted the subscriber telephone number, subscriber RACF password or the forward-to telephone number. Processor 205 then exits the program.

At step 403, if the contents of record 250 indicate that call-forwarding is selective and/or activated by the subscriber, then processor 205 presumes that the subscriber has activated call-forwarding to IAS 122. Call-forwarding by the subscriber to IAS 122 is performed according to the features of the call-forwarding service.

At step 404, processor 205 then sets up the call-back list monitor for calls that are forwarded to IAS 122 as a result of the data terminal 114 subscriber's telephone line 111 being busy on the Internet. The processor 205 program then exits.

If the subscriber, in response to the displayed failure message, enters a request for an RACF activation retry, in which the request may contain a corrected CO 108 RACF service telephone number or another password that is to be supplied to CO 108, then the processor program is entered at step 401 and proceeds to step 409.

At step 409, if the subscriber entered a valid request, and an error threshold has not been exceeded, then the processor program returns to step 402. In doing so, the program unloads the associated record 250 from memory.

At step 410, if the subscriber does not enter a valid request or repeatedly fails to enter a correct password, then processor 205 transmits a help message and exits.

Incoming Call Processing

In preceding steps, the subscriber establishes call-forwarding to IAS 122 and sets a not-available-for-incoming-calls state while on-line. If, while the subscriber is busy "surfing" the Internet, a caller at station 116 (the calling station) places a call to station 118 (the called station), then a telephone connection is established in a conventional manner from the station 116 telephone line to CO 108 via CO 110, TS 109 and TS 107 (FIG. 1). Specifically, responsive to the receipt of the station 116 call, CO 108 determines that station 118 is busy and that station 118 has activated call forwarding to IAS 122. As such, CO 108, in a conventional manner, directs the call to IAS 122 in accord with the call forwarding telephone number that CO 108 received as interacting with IAS 122 in the manner discussed above. Activation of call-forwarding is by the RACF process illustrated in FIG. 4, or by conventional call-forwarding procedures. In forwarding calls, CO 108 sends a message to TS 107 requesting a rerouting of the station 116 call and containing the IAS 122 telephone number as the destination for such rerouting. Such a message will typically contain the telephone number of the called party (station 118) and may also contain the telephone number and caller identification of the forwarded party, namely station 116. TS 107, in response to the receipt of the message, routes the call to its new destination, IAS 122. To re-route the call, TS 107 signals IAS 122 (PBX 235) that a call is being routed (forwarded) thereto via an idle B channel serving the particular call type, in which such signaling is transmitted over the associated D signaling channel. (As mentioned above, if the call is being forwarded to IAS 122, then TS 107 routes the call via communications path 150-10. Calls directed to Internet 120, on the other hand, are routed over communications path 150-11.) The signaling information that is transported over a D channel of path 150-10 includes, inter alia, the forward-to-number used by CO 108 and the telephone number of station 118. Such information may also include the calling party telephone number (station 116). PBX 235, responsive to receipt of such information, sends a message identifying the newly-arrived call and containing information relating thereto to processor 205 via API 230.

Figure 5:
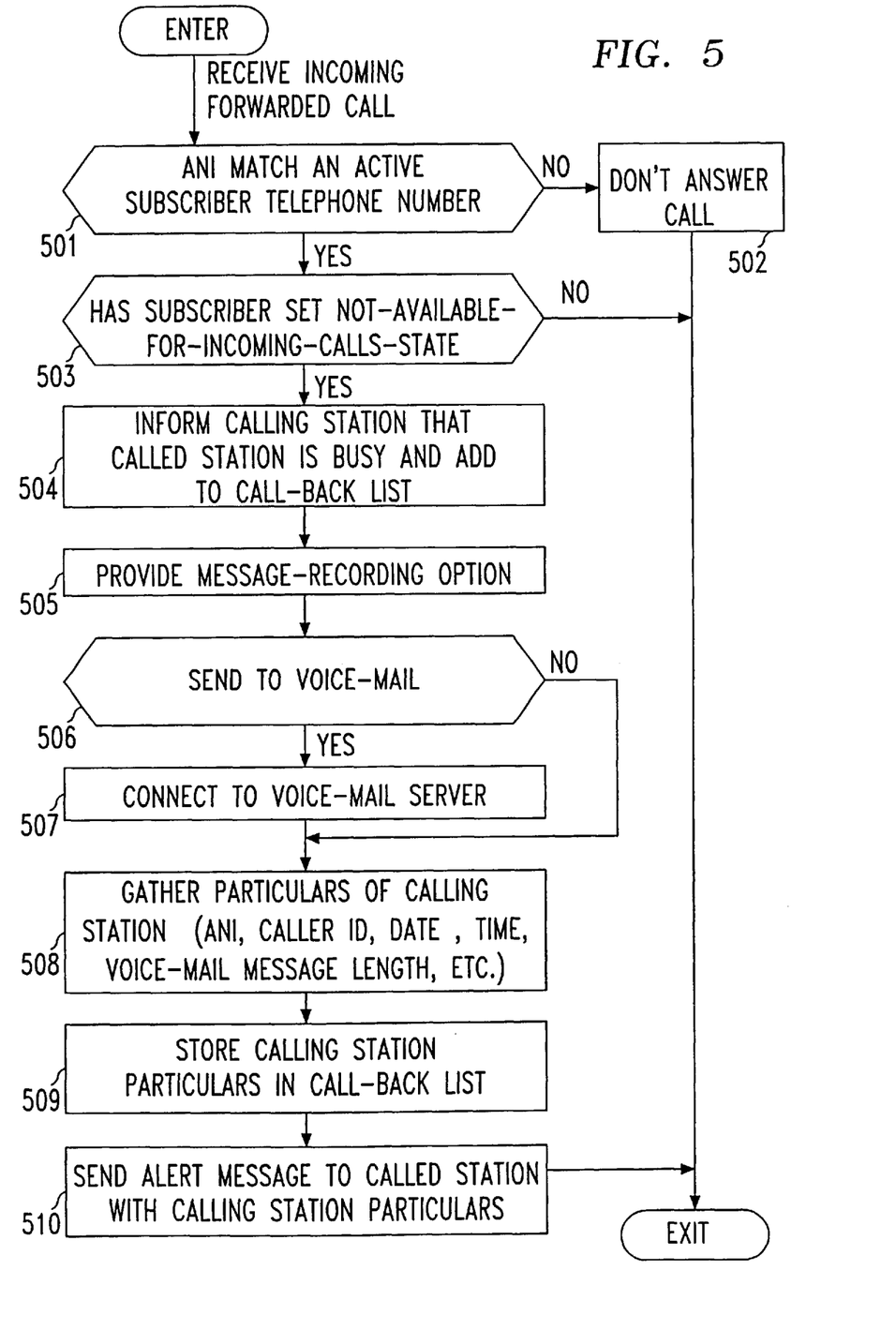

Since the station 116 call is forwarded to IAS 122 via path 150-10, then the call is received via PBX 235. Referring now to FIG. 5, upon receipt of the call, PBX 235 alerts processor 205 to the incoming call and passes the station 116 telephone number as well as the station 118 telephone number thereto. At step 501, processor 205, in response to receipt of the station 118 telephone number uses the number to access its internal memory, unload a copy of the subscriber's record 250 and check for an active terminal.

At step 502, if the subscriber is not connected to IAS 122, then processor 205 does not answer the call and exits, thereby leaving it to the calling party and PBX 235 to terminate the call in a conventional manner.

At step 503, processor 205 checks the contents of field 250-15, FIG. 2, to determine if the called subscriber has set a not-available-for-incoming-calls state. If the subscriber has not set that state, then processor 205 exits the program.

At step 504, if the contents of field 250-15, FIG. 2, indicate that the subscriber has set a not-available-for-incoming-calls state, then processor 205 informs station 116 that station 118 is busy and that particulars of their call will be added to the subscribers' call-back list.

At step 505, processor 205 provides station 116 a message recording option. To provide the message recording option, processor 205 directs PBX 235 to redirect the station 116 incoming call on path 150-10 to voice-mail server (VMS) 265.

At step 506, processor 205 determines whether station 116 selects the message recording option. As such, VMS 265 transmits an announcement to station 116 and presents the station with the option to leave a message for station 118.

At step 507, if the message recording option is selected, processor 205 connects station 116 to the Voice-mail Server (265 in FIG. 3). Station 116 may then interact with VMS 265 in a conventional manner to exercise the message recording option or terminate the call. When station 116 finishes a message, processor 205 determines the message length in seconds from VMS 265.

At step 508, processor 205 gathers particulars of the call and calling station 116. The particulars include the fact of the call, station 116 telephone number, station 116 identification, date and time of the call, and length of any message.

At step 509, processor 205 stores the particulars of the call and calling station 116 in the call-back list server (275 in FIG. 3).

At step 510, processor 205 assembles and sends an alert message to station 118, which includes call and calling station 116 particulars. To send the alert message, processor 205 assembles the alert message into one or more data packets each containing the assigned Internet IP address of station 118 as the destination and supplies each such packet to IIU 215 via LAN 240. IIU 215, in turn, routes the packets to module IAU 255, which then transmits the payload data over path 150-11 and the assigned B channel in a conventional manner. The data is then transported over the connection to CO 108, for transmission over connection 111 (FIG. 1). Upon receipt of the data, data terminal 114 processes the information characterized by the data, e.g., the aforementioned alert message. In this manner, data terminal 114 receives information that an incoming call was received, forwarded to IAS 122, and added to the call-back list. This informs the subscriber at station 118 of the call even though the subscriber's telephone line is connected to the Internet.

As described, processor 205 sends an alert message to data terminal 114, to inform the subscriber that a call was received while the not-available-for-incoming-calls state was set. The alert message also forwards the particulars of the call and calling station as they were added to the call-back list. The steps performed by data terminal 114 are further illustrated in FIG. 6 and described below.

Figure 6:
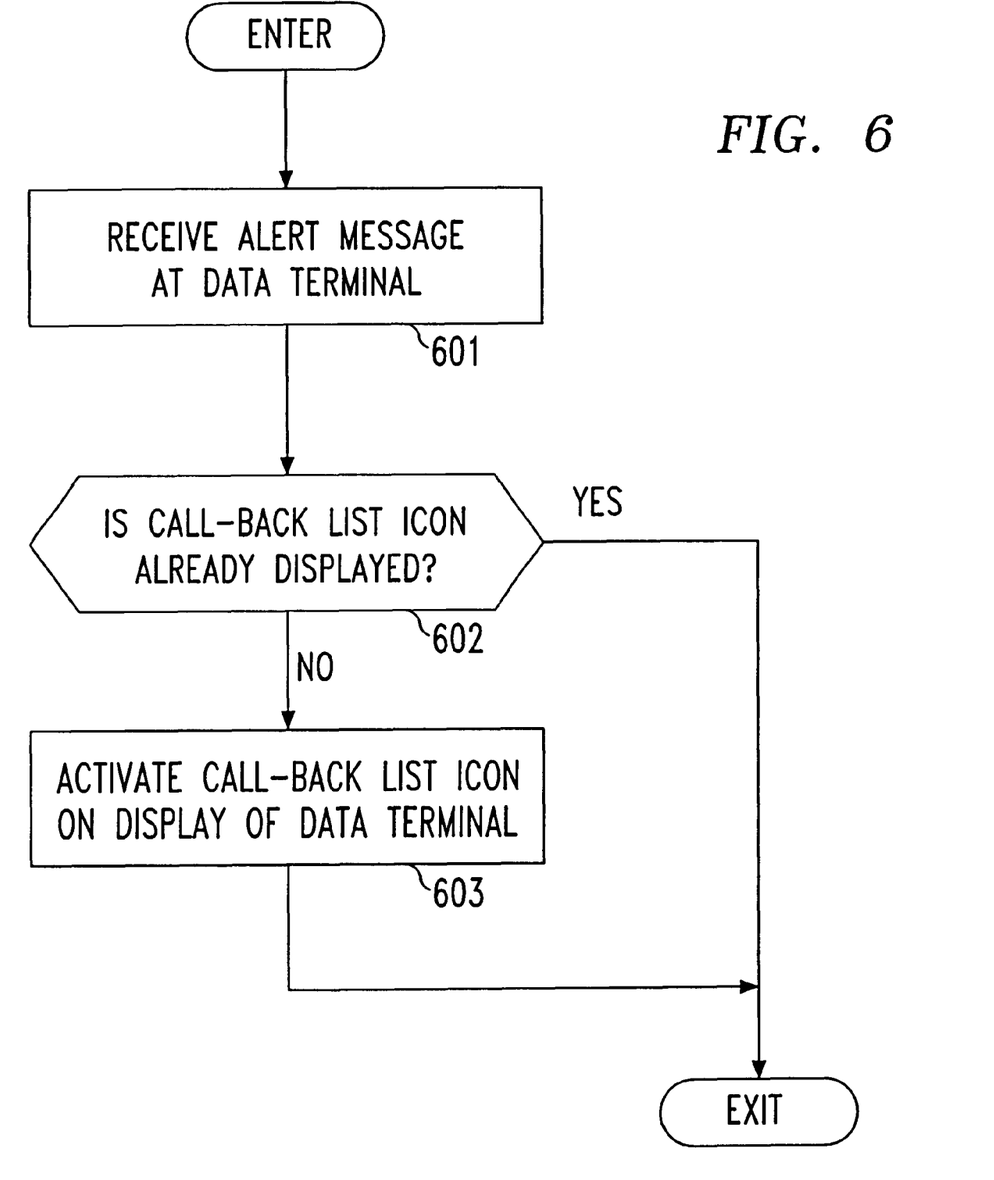
FIGS. 6, 8 and 9 illustrate in flow chart form the programs which implement the principles of the invention in the subscriber terminal of FIG. 1.

At step 601, data terminal 114 receives an alert message transmitted by processor 205. The alert message serves to inform station 118 that a call was received while the subscriber at station 118 was on-line, having set a not-available-for-incoming-calls state. The alert message preferably includes particulars of the call and the calling station (fact of the call, telephone number, caller identification, date and time of the call, and length of any message.)

In response to the alert message, at step 602, data terminal 114 determines whether an icon, representing calls in the call-back list, is already present on the display of data terminal 114. If data terminal 114 determines that the icon is already present, the program exits.

The icon that appears on the display of data terminal 114 does not interrupt the subscriber or require a response. In addition, the icon may be transitory, meaning that it temporarily changes appearance when a call is stored in the call-back list. Alternatively, the icon may be semi-permanent, appearing when the first call is stored in the call-back list and remaining visible thereafter or at least until calls are retrieved or the session is terminated.

At step 603, if an icon representing calls in the call-back list is not displayed on the display of data terminal 114, then data terminal 114 activates an icon representing calls in the call-back list, and exits the program.

Return Call Processing

Figure 8:
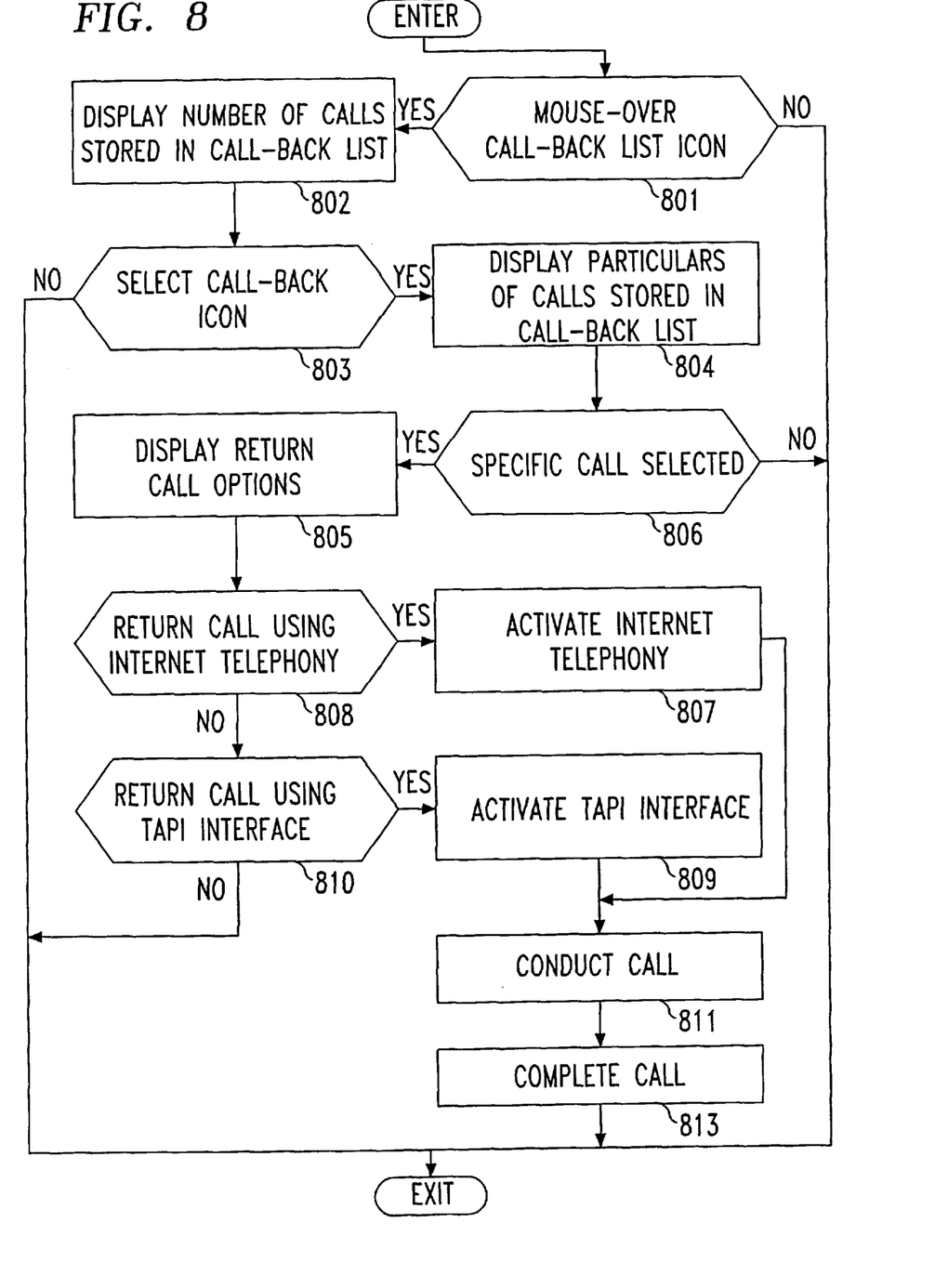

At any time after particulars of a call are stored in the call-back list server 275, the subscriber may review calls or return calls. Referring to FIG. 8, at step 801, data terminal 114 determines that the subscriber moves a mouse pointer over the call-back list icon on the display of data terminal 114, but does not select or click on the icon.

At step 802, in response to the mouse-over, data terminal 114 displays a text box. The text box displays the number of calls stored in the call-back list server 275.

At step 804, if data terminal 114 determines that the subscriber selected the call-back list at step 803, such as by clicking the icon, particulars of calls stored in the call-back list are displayed for the subscriber. The data terminal display contains a list of numbers and date/time of the call, with caller identification information from the call. If the caller identification is blocked by the caller, the call-back list can contain information from a data-base comparison of the calling station telephone number with telephone numbers of known callers. This is valuable where a calling station has blocked caller identification, but the called station knows the calling station identification and wants to take the call even though the caller identification is blocked. This data base information is stored at data terminal 114 or at another location on the system such as in a PIM. In this manner, the call-back list provides caller identification information even for calls that did not provide caller identification. If station 116 leaves a message, station 118 will see the size or length of the message stored in the voice-mail server 265.

In this way the subscriber can periodically check if a particular call arrived while he/she was on-line even though they were not to be disturbed every time a new called arrived.

The subscriber can also elect to hear the recorded message by a suitable action, such as double click of the voice-mail indicator. This is described in greater detail below.

At step 805, if the subscriber selects a specific call on the call-back list in step 806, data terminal 114 presents the subscriber with return call options.

At step 807, if the subscriber selects Internet telephony as the return call option in step 808, data terminal 114 activates Internet telephony using system 100 to return the call. Internet telephony is discussed below in greater detail.

At step 809, if the subscriber selects TAPI as the return call option in step 810, data terminal 114 determines whether the subscriber has a second telephone line useable without disconnecting from the Internet 120, or whether data terminal 114 can only access one telephone line, in which case the subscriber must disconnect from the Internet before using the TAPI interface. With two telephone lines, data terminal 114 establishes the TAPI interface and places the return call on the non-busy line using the stored particulars of station 116. Otherwise with a single telephone line, data terminal 114 informs the subscriber that they are still connected to the Internet by connection 111 and must either place the return call with Internet telephony, or wait until the connection to the Internet is terminated.

At step 811, data terminal 114 monitors the progress of the return call until the subscriber completes the call at step 813 and hangs up.

Figure 7:
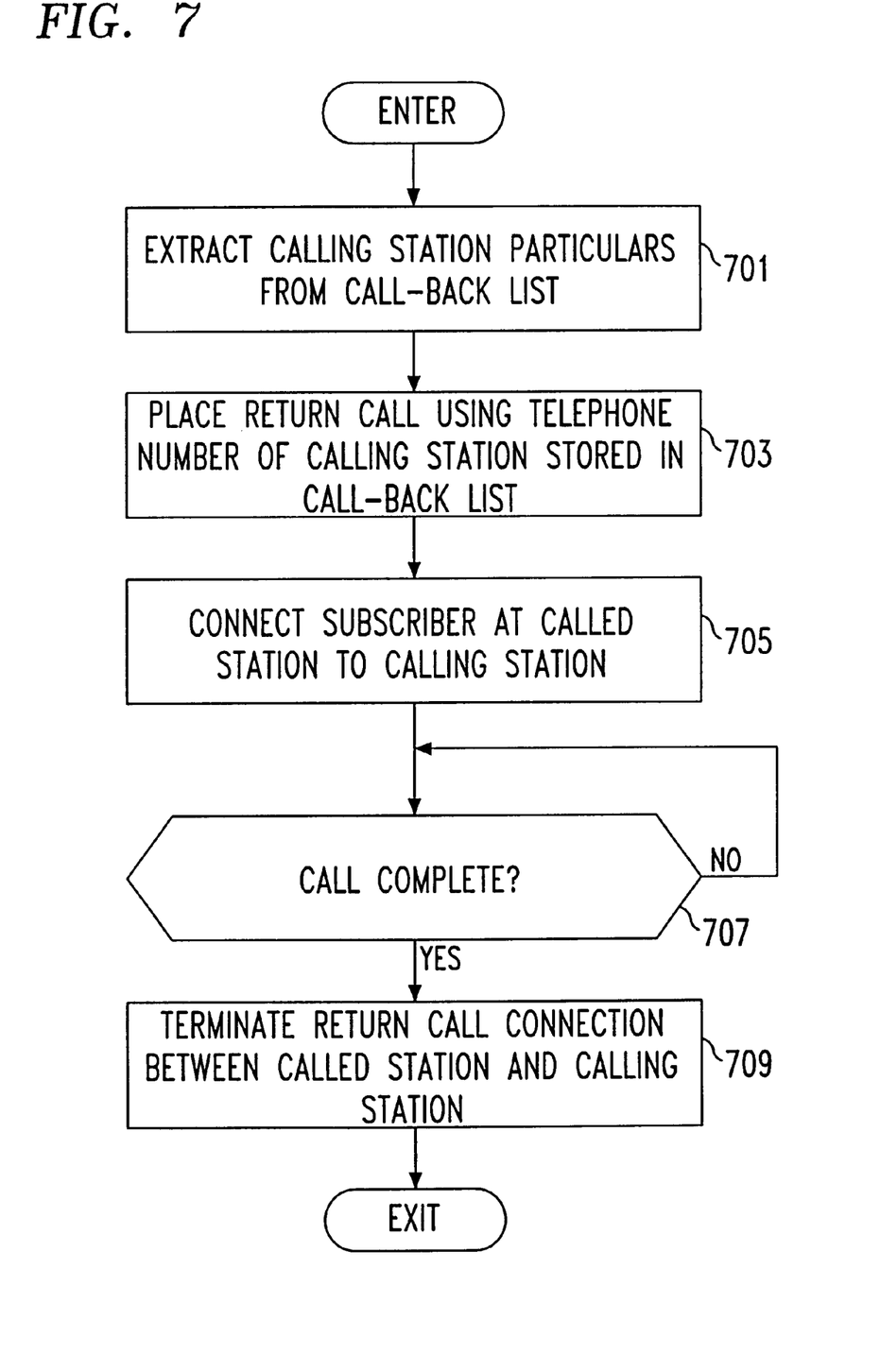

Referring now to FIG. 7, at step 701, IAS 122 responds to instructions from data terminal 114 by extracting particulars of station 116 that are stored in the call-back list. These particulars include the telephone number of station 116, caller identification, date and time of the call, and length of any message stored on voice-mail server 265.

At step 703, IAS 122 responds to instructions from data terminal 114 by placing a return call to the selected call on the call-back list. As illustrated in FIG. 8 and described above, the subscriber selects a particular call for return and also selects a mode for placing the return call. Examples of return call modes are Internet telephony and TAPI interface.

At step 705, IAS 122 connects the subscriber to the telephony number, and at step 707 monitors the call progress.

At step 709, IAS 122 terminates the connection when the signaling protocol from either party indicates that the call is complete.

If the subscriber selected Internet telephony at step 808 as the return call mode, data terminal 114 signals processor 205 over communication path 150-11. In response, processor 205 bridges the return call by forwarding the telephone number of the selected station (station 116 in the example) to VRU 225, via API 220. Processor 205 instructs VRU 225 to place an outgoing return call to the number of station 116. A method to bridging calls using system 100 is described here and again below under Message Recording Playback.

In response to receiving an outgoing call request from VRU 225 via telephone line connector 260, PBX 235 selects an idle channel of communication path 150 (FIG. 1, here communication path 150-12) and sends a call setup message via the associated signalling channel to TS 107, in which the message includes the telephone number of the selected calling station (station 116) from the call-back list.

TS 107, in turn, translates the telephone number into a routing indicator, and, in accord with that indicator, establishes a telephone connection in a conventional manner to station 116. Once the voice telephone connection between IAS 122 and station 116 is established, processor 205 instructs PBX 235 to connect the call to VSP 245, where analog voice is converted to digital voice, compressed and packetized for transmission on LAN 240. IAS 255 delivers the digitized, packetized voice from station 116 to data terminal 114 at station 118 over communication path 150-11.

The duplex voice path from station 118 through data terminal 114 to station 116 is sent over communication path 150-11 to IAS 255 where it is forwarded to PBX-235 via IIU 215 and VSP 245. PBX 235 completes the duplex voice path from station 118 to station 116, using conventional telephony.

It is also possible that instead of returning the call by Internet telephony, the subscriber will decide to return the call with a TAPI interface. In that case, if data terminal 114 has two modem cards and is connected to a second telephone line, terminal 114 activates the second modem with a TAPI interface and instructs the second modem to establish the return call to station 116 using the second telephone line.

Alternatively, if data terminal 114 is only connected to a single telephone line and that line is otherwise busy as a result of the connection to the Internet 120, the subscriber will be unable to return the call with the TAPI interface until the data connection to the Internet 120 is terminated. Thus, it is important for information from the call-back list to be stored in memory or data storage at data terminal 114. Otherwise, when data terminal 114 terminates the connection to IAS 122, the information in the callback list stored in the call-back list server 275 will no longer be accessible to data terminal 114.

It is also important that the subscriber have the ability to selectively save or view entries in the call-back list, even when messages are stored in the general message area. This allows the subscriber to immediately identify calls received and stored in messaging while on-line, as compared to calls received and stored in messaging while not on-line.

Two embodiments for return calls have been described (Internet telephony and TAPI interface). However other embodiments are available. For example, the subscriber may manually dial the number on telephone 102, after termination of the data connection between data terminal 114 and the Internet 120. Alternatively, a subscriber with two telephone lines can also manually dial the telephone number of station 116 on the second telephone line.

Message Recording Playback

Station 118 can also access, review and retrieve messages stored in VMS 265 while data terminal 114 remains connected to the Internet 120 through the IAS 122. Access and retrieval of messages is accomplished using the same type of voice processing circuitry that translates analog voice to packetized voice for transmission over data networks using a protocol such as TCP/IP. As an example, when the subscriber sets a not-available-for-incoming-calls state, they may at the same time instruct processor 205 to provide incoming calls the option to leave a message in VMS 265. When station 116 places a call to station 118, which is connected to the Internet 120 through the IAS 122, the IAS, which comprises voice-mail server 265 and call-back list server 275, performs the following functions. LAS 122 gathers the particulars of station 116 such as telephony number, caller identification, date and time of call. The particulars are stored on the call-back list server 275. Station 116 is also provided an option to leave a message in VMS 265. IAS 122 also stores the length or size of the message in call-back list server 275.

IAS 122 then sends an alert message to the station 118, using connection 111. The alert message causes data terminal 114 to display an icon, indicating that an incoming call was received and particulars stored in the call-back list. Depending on whether the alert message contains calling station particulars or not, will determine whether the icon contains sufficient information for the subscriber to view particulars of station 116 from the icon even after the data connection is terminated. Preferably, even if the particulars are stored in the call-back list server 275 at IAS 122, the alert message also contains particulars of station 116, which can be accessed at data terminal 114 using the icon displayed on data terminal 114. This allows station 118 to return the call to station 116, even after terminating the data connection to IAS 122.

To review or play previously recorded messages while data terminal 114 is connected to the Internet 120, processor 205 bridges the Voice-mail Server (265 in FIG. 3) to the subscriber via PBX 235, VSP 245, LAN 240 and IAU 255. Such "bridging" is established between VSP 245 and IAU 255 via LAN 240 and IIU 215 router as conventional data packet communications. Processor 205 unloads from memory 250 (i.e., field 250-7, FIG. 2) information identifying the type of packet voice software that is loaded in the subscriber's data terminal 114. Processor 205 then instructs processor 248 (VSP 245) to invoke NetMeeting software (or other software that performs a similar function) that is designed to process a voice call over a packetized network. The CPU 248 software, in turn, returns a response to processor 205 acknowledging its instruction to receive and transmit packets from and to the IP address previously assigned to the subscriber's Internet connection via Internet Access Unit 255.

Thereafter, the assigned VSP245/TLI 246 sends the recorded voice messages from voice-mail server 265 as a conventional data stream. CPU 248, in turn, collects the signals and forms them into packets in accordance with the aforementioned NetMeeting software, which attaches to each such packet the IP address assigned to the subscriber's connection. CPU 248 then presents the packet to LAN 240 and IIU 215, which in turn routes the packet in a conventional manner to the LAN 240 port connected to Internet Access Unit 255. Unit 255, in turn, transmits the data packet as well as any other packets received from Internet 120 and addressed to data terminal 114 over the B-channel assigned to the subscriber's connection.

When data terminal 114 receives packets via connection 111, the Internet software running on the subscriber's data terminal 114 examines each such packet to determine if it contains voice signals or information originating from the Internet. If the former, then the "Internet Phone" software reassembles the voice signal from a series of received packets, as is done conventionally, and then presents the result to the data terminal 114 sound card which causes the signals to be routed to the data terminal 114 loudspeaker for presentation to the subscriber. Internet information, on the other hand, is identified and processed in a background mode for display on the data terminal 114 display.

Figure 9:
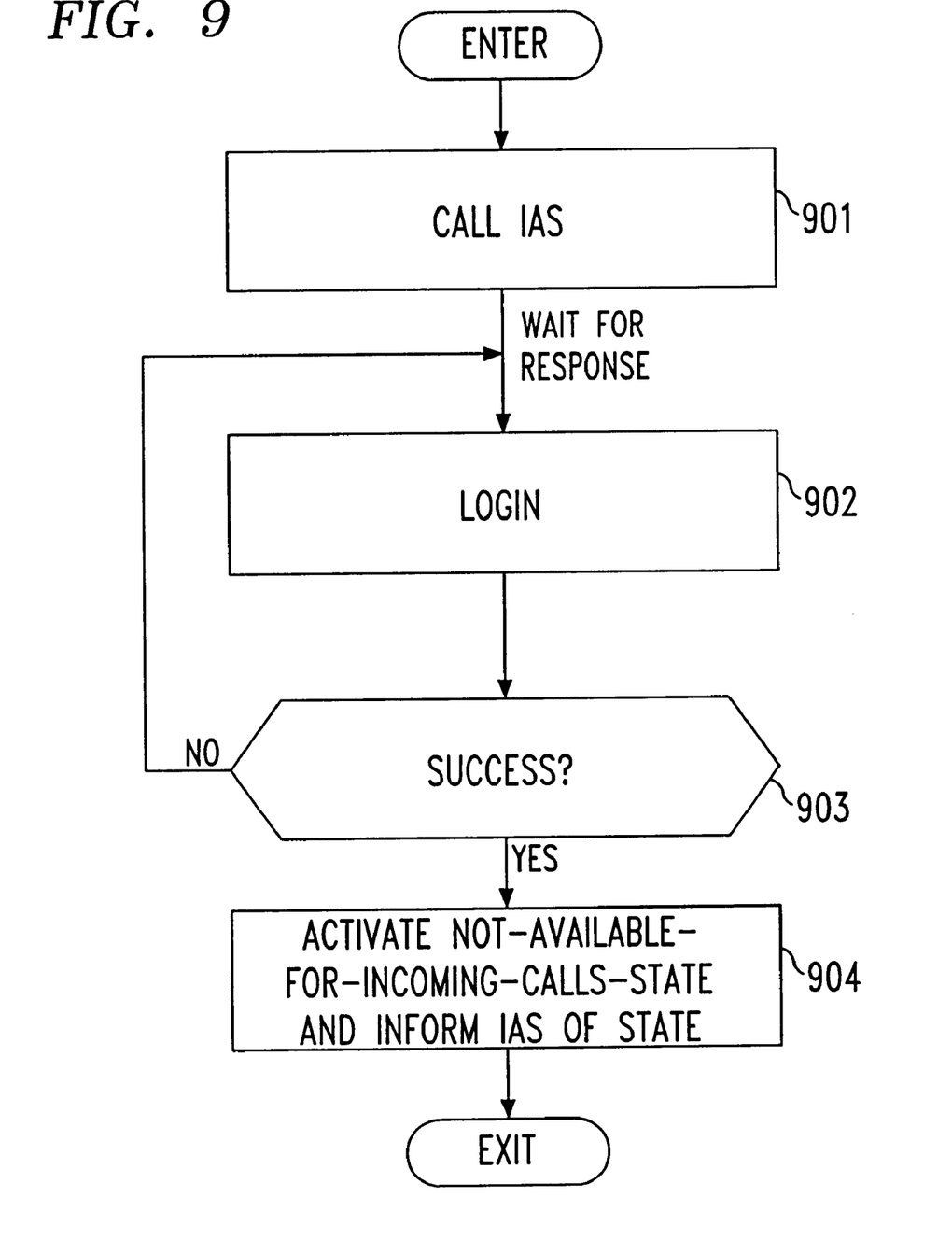

FIG. 9 illustrates in flow chart form the program that a terminal, e.g., data terminal 114, may invoke to place a telephone call to an IAS, e.g., IAS 122, for the purpose of establishing a connection to the Internet 120. As mentioned above, such software may be any one of a number of different software products that are designed to allow a subscriber to establish a telephone connection to an ISP, for example the Microsoft dial-up connection. Specifically, at step 901, when the dial-up terminal program is invoked it unloads from internal memory a data record containing the telephone number that the caller uses to access IAS 122. The program then prompts the subscriber for a user identity and password. The program then places a call to that telephone number and waits for receipt of a response from the called IAS, e.g., IAS 122.

At step 902, upon receipt of the expected response, the program sets up to "login" into the called IAS as is done conventionally by transmitting the subscriber identity and password.

At step 903, if the login is successful, the terminal application program sends a message to processor 205 indicating that it is an active terminal. If processor 205 receives that message, then it updates the contents of field 250-14 (FIG. 2) to indicate that the subscriber terminal is active.

If the login is not successful then, at step 902, the caller/subscriber may reenter his/her identity and password. It is noted that IAS 122 may terminate the call if the caller fails to enter a valid password after making several attempts to do so.

At step 904, the subscriber activates a not-available-for-incoming-calls state. The terminal application program reports this state to processor 205 by sending a message. Upon receiving this message, processor 205 updates the contents of field 250-15 (FIG. 2). The program then exits.

In the preceding embodiment VMS 265 uses analog message storage. In another embodiment, VMS 265 is a digital storage device, reducing the need for VSP 245.

In another embodiment, call-back list server 275 and VMS 265 are the same server. In this embodiment, VMS 265 stores calling station particulars and call particulars even when the calling station does not leave a message.

In another embodiment, call-back list server 275 is not part of IAS 122, but is electrically connected to IAS 122, such as through a WAN or the Internet.

In another embodiment, the call-back list server is a database maintained on data terminal 114. In this embodiment, voice-mail messages from station 116 are stored on VMS 265 at IAS 122, or alternatively in a voice-mail server on data terminal 114.

In the preferred embodiment described above, the call-back list is available when a subscriber is on-line and has set a not-available-for-incoming-calls state at the data terminal. This is particularly advantageous when the subscriber does not wish to be disturbed while on-line, but wants information or particulars regarding calls that are received while on-line and in that state.

Alternatively, the call-back list can also be available when a subscriber is on-line and has set an available-for-incoming-calls state. In this alternative embodiment, information related to particulars of the call and particulars of the calling station are stored in the call-back list regardless of whether the subscriber takes the call while on-line or performs another action, such as sending the call to messaging. In the manner previously described, the particulars may be stored in the call-back list at a remote server and the particulars may also be stored at the data terminal.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. A method comprising:
   receiving a telephone call directed to a called station from a calling station; and
   responsive to a data terminal at the called station being connected to an internet access server by a data connection and a not-available-for-incoming-calls state being set at the called station,
   storing particulars of the call and particulars of the calling station in a call-back server.

2. A method according to claim 1, further comprising responsive to the data terminal being connected to the server, sending an alerting message to the data terminal using the data connection.

3. A method according to claim 2, the alerting message including the particulars of the call and particulars of the calling station.

4. A method according to claim 1, further comprising storing a voice message from the calling station in a voice-mail server.

5. A method, comprising:
   connecting a data terminal at a called station to an internet access server including a call-back server by a data connection; and
   setting a not-available-for-incoming-calls state for the called station.

6. A method according to claim 5, further comprising receiving an alerting message, the alerting message responsive to a call from a calling station to the called station.

7. A method according to claim 6, further comprising displaying an icon on a display of the data terminal.

8. A method according to claim 7, the icon displaying particulars of the calling station.

9. A method according to claim 7, the icon displaying particulars of the call.

10. A method according to claim 5, further comprising placing a return call from the called station to the calling station using the particulars of the calling station.

11. A method according to claim 5, further comprising placing an internet telephony return call from the called station to the calling station using the particulars of the calling station.

12. A method according to claim 5, further comprising placing a return call from the called station to the calling station using a TAPI interface and the particulars of the calling station.

13. A method according to claim 5, further comprising retrieving a voice-mail message from a voice-mail server using the data connection.

14. A system comprising:
   a server;
   a call-back list stored in a call back server; and
   a data connection for connecting the server to a data terminal at a called station, wherein particulars of a call from a calling station to the called station are stored in the call-back list as a result of a not-available-for-incoming-calls state being set at the called station.

15. A system according to claim 14, further comprising a voice-mail server.

16. A system comprising:
   a data terminal at a called station; and a data connection, for connecting the data terminal to a server, wherein particulars of a call from a calling station to the called station and particulars of the calling station are stored in a call-back server as a result of a not-available-for-incoming-calls state being set at the called station.

17. A system according to claim 16, the data terminal including the call-back list.

18. A system according to claim 16, further comprising an icon on a display of the data terminal.

19. A system according to claim 18, the icon including particulars of the calling station.

20. A system according to claim 18, the icon including particulars of the call.

21. A system comprising:
means for receiving a telephone call directed to a called station from a calling station; and
responsive to a data terminal at the called station being connected to a server by a data connection and a not-available-for-incoming-calls state being set at the called station, means for storing particulars of the call and particulars of the calling station in a call-back server.

22. A system according to claim 21, further comprising means for sending an alerting message to the data terminal.

23. A system according to claim 22, the alerting message including particulars of the call and particulars of the calling station.

24. A system according to claim 21, further comprising means for storing a voice message from the calling station.

25. A system comprising:
means for connecting a data terminal at a called station to an internet access server including a call-back server; and
means for setting a not-available-for-incoming-calls state for the called station.

26. A system according to claim 25, further comprising means for placing a return call from the called station to the calling station using the particulars of the calling station.

27. A system according to claim 25, further comprising means for displaying an icon at the called station, the means for displaying being responsive to the alerting message.

28. A system according to claim 27, the icon including particulars of the calling station.

29. A system according to claim 27, the icon including particulars of the call.

30. A system according to claim 25, further comprising means for retrieving a voice-mail message using the connecting means.

31. A method for processing a telephone call comprising:
receiving a call directed to a called station from a calling station;
responsive to the called station having established a data connection between a data terminal at the called station and a server, forwarding the call to the server;
responsive to the call, sending an alerting message from the server to the data terminal using the data connection;
responsive to a not-available-for-incoming-calls state being set at the called station, storing particulars of the call and particulars of the calling station in a call-back server;
responsive to the alerting message, displaying an icon on a display of the data terminal; and
placing a return call from the called station to the calling station using the particulars of the calling station stored in a call-back list stored in the call-back server.

32. A system comprising:
a data terminal at a called station;
a data connection;
a server connected to the data terminal using the data connection;
a switch communicating with the called station and a calling station, the switch receiving a call directed from the calling station to the called station and forwarding the call to the server, the server sending an alerting message to the data terminal over the data connection;
a call-back list stored in a call-back server, the call-back list storing particulars of the call and the calling station as a result of a not-available-for-incoming-calls state being set at the called station; and
an icon, the icon displayed on the data terminal in response to the alerting message.

33. Computer executable software code stored on a computer readable medium, the code for processing a telephone call, the code comprising:
code responsive to a data terminal at a called station being connected to a server by a data connection and a not-available-for-incoming-calls state being set at the called station to process calls from a calling station to the called station; and
code to store particulars of the call and the calling station in a call-back server.

34. Computer executable software code according to claim 33, further comprising code to send an alerting message from the server to the data terminal.

35. A computer-readable medium having computer executable software code stored thereon, the code for processing a telephone call, the code comprising:
code responsive to a data terminal at a called station being connected to a server by a data connection and a not-available-for-incoming-calls state being set at the called station to process calls from a calling station to the called station; and
code to store particulars of the call and particulars of the calling station in a call-back server.

36. A computer-readable medium according to claim 35, further comprising code to send an alerting message from the server to the data terminal.

37. A programmed computer for processing a telephone call, comprising:
a memory having at least one region for storing computer executable program code; and
a processor for executing the program code stored in the memory; wherein the program code includes code responsive to a data terminal at a called station being connected to a server including a call-back server by a data connection and a not-available-for-incoming-calls state being set at the called station to process calls from a calling station to the called station; and
code to store particulars of the call and particulars of the calling station in a call-back list.

38. A programmed computer according to claim 37, further comprising code to send an alerting message from the server to the data terminal.

39. Computer executable software code stored on a computer readable medium, the code for processing a telephone call, the code comprising:
code connecting a data terminal at a called station to a server including a call-back server by a data connection; and
code setting a not-available-for-incoming-calls state at the called station.

40. Computer executable software code according to claim 39, further comprising code to display an icon on a display of the data terminal.

41. Computer executable software code according to claim 39, further comprising code to store particulars of the call and particulars of a calling station in a call-back list.

42. A computer-readable medium having computer executable software code stored thereon, the code for processing a telephone call, the code comprising:

code connecting a data terminal at a called station to a server including a call-back server by a data connection; and     code setting a not-available-for-incoming-calls state at the called station.

43. A computer-readable medium according to claim 42, further comprising code to display an icon on a display of the data terminal.

44. A computer-readable medium according to claim 42, further comprising code to store particulars of the call and particulars of a calling station in a call-back list.

45. A programmed computer for processing a telephone call, comprising:

a memory having at least one region for storing computer executable program code;

a processor for executing the program code stored in the memory; wherein the program code includes code connecting a data terminal at a called station to a server including a call-back server by a data connection; and     code setting a not-available-for-incoming-calls state at the called station.

46. A programmed computer according to claim 45, further comprising code to display an icon on a display of the data terminal.

47. A programmed computer according to claim 45, further comprising code to store particulars of the call and particulars of a calling station in a call-back list.

48. A method for processing the call at a called station in an online state, comprising:

receiving a call at a called station in an on-line state;

determining if the called party subscribes to a call back list;

determining whether the subscriber has set a not-available-for-incoming calls state for the called party;

checking a data record of the called party to determine if a call forwarding function may be activated by a server; and     setting up a call back list monitor for calls forwarded to the server as a result of the called party station being in an online state.

49. A method for call processing for a called station in an online condition, comprising:

receiving an incoming forwarded call at the called station;

checking the contents of a data record of the called station to determine if the call subscriber has set a not-available-for-incoming call state;

exiting the program if the not-available-for-incoming call state has not been set, otherwise, informing calling station that the called station is busy;

providing a message recording option to the calling party;

storing a voice message in a voice mail server;

collecting particulars of the calling station including calling station telephone number, date and time of call, and length of any message;

storing calling station particulars in a call back server; and     sending an alert message to the called station with the calling station particulars.

50. A telephone call process for called stations in an online condition, comprising:

displaying calls stored in a call-back list stored in a call-back server;

selecting a call-back icon;

displaying particulars of calls stored in the call-back lists;

selecting a specific call to return;

displaying return call options;

returning the specific call using Internet telephony after activating Internet telephony; or     returning the specific call using public telephony after activating a Telephone Application Programming Interface; and     conducting the specific call with calling party selected from the call-back list.

\* \* \* \* \*